July 6, 1943.   W. A. SCOTT   2,323,851
MILKING MACHINE TEAT CUP
Filed Sept. 9, 1941
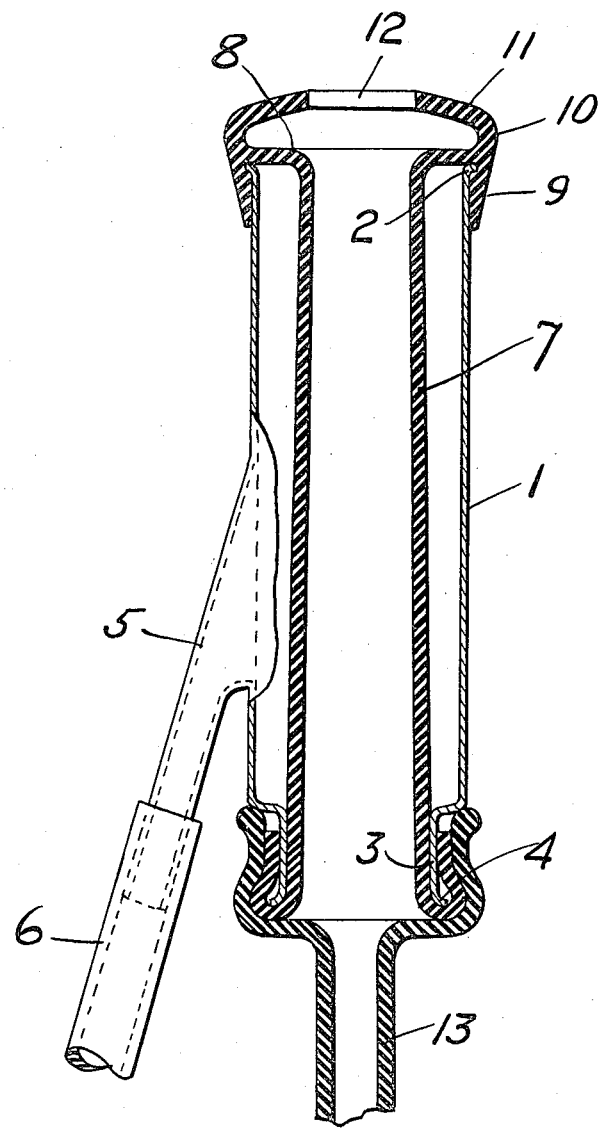
WITNESS:
Rob't P. Kitchel
INVENTOR
Walter A. Scott
BY
Busser and Harding
ATTORNEYS.

Patented July 6, 1943

2,323,851

UNITED STATES PATENT OFFICE 2,323,851

MILKING MACHINE TEAT CUP

Walter A. Scott, Poughkeepsie, N. Y., assignor to The De Laval Separator Company, New York, N. Y., a corporation of New Jersey Application September 9, 1941, Serial No. 410,127

5 Claims. (Cl. 31—85)

My invention relates to that class of teat cups for milking machines which are operated by varying pneumatic pressure and particularly of the type having a flexible walled inner teat receiving chamber in which a subatmospheric pressure is constantly maintained and a surrounding annular chamber in which the pressure pulsates between about atmospheric and about the same as that in the inner chamber.

Among the principal problems involved in designing a commercially satisfactory tea cup are: the maintenance of the cup on the teat under all conditions of milking; satisfactory and dependable operation with fast milking; and giving to the teat cup the longest possible life. A great number of teat cups have been commercially used and a larger number have been patented and teat cups of more recent design embody few details of construction that have not been long well known. So far as later teat cups are superior to earlier teat cups, such superiority consists rather in new combinations of old features than in specifically new features. None of them, however, satisfactorily solves the problems above specified.

A teat cup embodying my invention, while containing certain features of specific novelty, also embodies a number of features that are separately old. In my invention all these features (characterizing mainly the "liner" that divides the two chambers) cooperate to attain my object, namely, the solution of the above problems, whereby the teat cup, when applied to the teat, more dependably stays thereon and functions perfectly with the most practicably rapid milking and whereby the life of the relatively short lived structural element—the liner—is substantially prolonged.

The single figure of the drawing shows a longitudinal cross-section of a preferred embodiment of my improved teat cup.

The main body 1 of the rigid shell has at its upper end an outwardly extending bead 2 and at its lower end a contracted neck 3 terminating in an outwardly extending bead 4. A tubular branch 5 from the shell body 1 is adapted to receive around it a flexible tube 6, providing communication with a source of pneumatic pulsations having the frequency and the range of pressure—typically alternating atmospheric and about half atmospheric pressure—required for efficient operation.

The lower end of the flexible and elastic (rubber) liner 7 is of a diameter to fit the contracted neck 3 of the shell and extends around the end thereof and hence upward outside and in contact therewith. It is readily so applied to the shell by passing it through the shell neck, and (after the top of the liner is secured to the shell as hereinafter described) pulling it down to place it in tension and then turned up around the lower end of the neck. The milk outflow tube 13, also of rubber, has an expanded head of flexible and elastic material which, when applied to the teat cup, extends under and around the turned up end of the liner so as to hold it against the neck, the upper end of said head abutting against the shoulder between the shell body and shell neck. This construction is like that of the teat cup patented to me October 29, 1940, No. 2,219,945.

From the top of the liner body 7 an approximately flat portion 8 extends outward to the full diameter of the shell and thence both downward around the head 2 against the outer wall of the shell, as shown at 9, and upward and then inward at an upward angle, as shown at 10 and 11, to surround a mouth 12, located above and spaced from the flat portion 8 a distance (say) about equal to 25% of the inner diameter of the upper end of the liner body.

The upwardly extending portions 10 and 11 may be of the same thickness as the remainder of the liner and the maximum diameter portion 10 has, at a height substantially different from (either above, as shown, or below, though preferably above) that of the bead 2, an outer diameter substantially greater than that of the portion surrounding and in the plane of the bead.

An important feature of the invention is the shape of the body of the liner, which is nearly but not quite cylindrical, it being tapered from a slightly larger diameter at the bottom to a slightly smaller diameter at the top. The degree of taper, however, must be slight and must be kept within narrow limits and the variable diameter should have a fairly fixed relation to the thickness of the liner wall, which is preferably of substantially uniform thickness.

Since the successful operation of the liner depends largely on keeping within a certain absolute relative range of measurements, measurements to which the commercial teat cup conforms will be given as illustrative but without limitation except so far as essential limitations are recited in the claims.

The body, or teat-receiving portion, of the liner should have a wall about ⅛" thick, an outside diameter between 1⅜" and 1⅜", preferably ⅞", at its bottom, and should taper inward to between 11/16" and 13/16", preferably about 3/4", diameter at its upper end. The upper inner diameter may be from about 7% to not over 21%, preferably about 14%, smaller than the lower inner diameter, the difference in these diameters being preferably approximately equal to the thickness of the liner wall, the inner diameter of the lower end of the body of the liner being, therefore, smaller than the outer diameter of the upper end of the body of the liner.

The inner diameter of the mouth 12 should be between 13/16" and 15/16", preferably about 7/8", or somewhat greater, e. g., 8% greater, than the inner diameter of the upper end of the liner body but not substantially exceeding, and preferably slightly less than, the inner diameter of the lower end of the liner body.

The parts 8, 9, 10 and 11 of the liner may be of about the same thickness as the teat-receiving body portion of the liner, but this is not an essential feature. The inwardly and upwardly extending mouthpiece 11 of the liner should be so molded as to extend at a relatively wide angle to the axis of the cup, say from 60° to 85°, or preferably about 75° to said axis. The mouth 12 must be a substantial distance above the upper end of the body portion of the liner, being preferably spaced from the flat portion 8 about 5/16".

I have made tests of many forms of mouthpieces and have found that a mouthpiece, even though flexible and elastic, unless located substantially above the upper end of the body portion of the liner, and unless its size is kept within narrow limits, relative to the upper end of the liner body, approximating those above described, and unless its shape substantially conforms to that described, will not dependably stay on the teat, will more or less choke the flow of milk, and will not retain its shape. For example, I have found that if the mouthpiece is formed flat it will, after absorbing animal fats from the cow's udder, be displaced downward and will stretch so that it will not fit as closely as it should around the teat. However, if it is given the form of the frustrum of a rather flat cone, as above described, absorption of fats will cause it to take a steeper angle so that, when flattened by pressure against the udder, the mouth will be closed in and fit with the necessary tightness around the teat without, however, choking the flow of milk; and its shape during the milking operation will not substantially deviate from that shown and described.

Liners of most or all commercial teat cups are of uniform diameter throughout their length, and at what has been in the past the usual rate of milking, a liner whose body is of uniform diameter, and whose upper end portion is constructed as herein shown and described, will function fairly satisfactorily, but is not so absolutely dependable where the milking is rapid. With the development of the milking machine art, more rapid milking has become feasible and has made teat cup requirements more stringent. While a liner with the shell-engaging and teat-engaging elements as herein described is more nearly adapted than other liners known to me to meet these more stringent requirements, I have found that a slight deviation from uniform diameter of the liner body meets these more stringent requirements fully. I am aware that it is not uncommon to provide a liner with a diameter tapering inward from top to bottom and that it is also known, exceptionally, to taper it in the opposite direction. I have found that the latter type of liner is most efficient, but that its efficiency depends upon the degree of taper, a pronounced degree of taper giving distinctly inferior results to a liner of uniform diameter. I have hereinbefore described this feature of my invention and defined the range of substantial efficiency and given specific illustrative dimensions that will enable those skilled in the art to construct the liner without the necessity of experimentation. The successful functioning of a liner of this character also depends upon maintaining the liner body, throughout the length of the shell body, out of contact therewith during milking, requiring the employment of that known type of shell which has a contracted lower neck, around which the lower end of the liner is stretched and confined in position. The most efficient means for effecting this result, as well as to allow the liner to be adjustably stretched after a period of use and to be reliably held in the stretched position, is that described and claimed in my said prior Patent No. 2,219,945, which means, of course, are not herein per se claimed.

The described construction of the upper portion of the liner has another advantage not hereinbefore discussed. I have found that many failures of liners are due to the bead at the top of the shell cutting through the liner when the cup strikes against some hard object. I have reduced, if not completely eliminated, this danger by placing the maximum outside diameter of the part of the liner fitting around the top of the shell at a height different from, preferably above, the bead around the shell.

The main advantages of my improved liner may thus be summarized as follows:

Retention of the teat cup on the teat even after absorption of animal fat, capacity for rapid as well as clean milking, protection against damage by careless handling, and longer life, without sacrifice of any feature that characterizes the most efficient teat cups of the prior art.

What I claim is:

1. A milking machine teat cup comprising a rigid outer shell having a tubular body of substantially uniform diameter and a contracted neck at its lower end and a flexible and elastic liner having at its upper extremity an abruptly expanded disc portion secured to the upper extremity of the shell, the liner at its lower end being confined within the shell neck, the main body of the liner being of approximately equal thickness throughout its length and, when subjected to balanced pressure, tapering along both its inner and outer walls inward from its lower end to its upper end, the thickness of the liner body being such and its degree of taper being so limited that its upper outside diameter exceeds its lower inside diameter.

2. A milking machine teat cup comprising a rigid outer shell having a tubular body of substantially uniform diameter and a contracted neck at its lower end and a flexible and elastic liner having at its upper extremity an abruptly expanded disc portion secured to the upper extremity of the shell, the liner at its lower end being confined within the shell neck, the main body of the liner being of approximately equal thickness throughout its length and, when subjected to balanced pressure, tapering along both its inner and outer walls inward from its lower end to its upper end, the thickness of the liner body being such and its degree of taper being so limited that its inside diameter within the shell neck does not exceed its outside diameter within the upper end of the shell body.

3. In a milking machine teat cup, the combination with an outer shell having a contracted neck at its lower end, of an inner flexible and elastic liner extending through the shell and the body of which has a slight inward taper from its lower end to its upper end and has its lower end confined within the shell neck and having an upper end portion which comprises an annular disc member that extends abruptly outward from the liner body over the upper end of the shell and has two annular branch flexible members one of which extends down around the outside of the upper end part of the shell and the other of which extends upward and inward and forms a teat-receiving mouthpiece spaced a substantial distance above said annular disc member, and of an inner diameter exceeding the inner diameter of the upper end, but not exceeding the inner diameter of the lower end, of the body of the liner.

4. A milking machine teat cup comprising a rigid outer tubular shell and a flexible and elastic liner the body of which extends through the shell and at its lower end is attached to the lower end of the shell, the liner having an upper end portion which comprises an annular disc member that extends abruptly outward from the liner body over the upper extremity of the shell and has two annular branch members one of which extends down for a substantial distance around the outside of the upper part of the shell and the other of which extends upward and thence inward and slightly upward in the form of a rather flat cone to thereby provide a mouthpiece, the outer wall of the said annular branch members being of non-uniform diameter, its maximum diameter being below the inner edge of the mouthpiece and at a height substantially different from the upper extremity of the shell.

5. A milking machine teat cup comprising a rigid outer tubular shell and a flexible and elastic liner the body of which extends through the shell and at its lower end is attached to the lower end of the shell, the liner having an upper end portion which comprises an annular disc member that extends abruptly outward from the liner body over the upper extremity of the shell and has two annular branch members one of which extends down for a substantial distance around the outside of the upper part of the shell and the other of which extends upward and thence inward and slightly upward in the form of a rather flat cone to thereby provide a mouthpiece, the outer wall of the upwardly extending branch member bulging outward at a level below the inner edge of the mouthpiece but at a level substantially above the upper extremity of the shell.

WALTER A. SCOTT.